United States Patent

Bachofen

[11] Patent Number: 5,919,406
[45] Date of Patent: Jul. 6, 1999

[54] PLATE HEAT EXCHANGER WITH WETTING DEVICE

[75] Inventor: Friedrich Bachofen, Elgg, Switzerland

[73] Assignee: Polybloc AG, Switzerland

[21] Appl. No.: 08/875,058

[22] PCT Filed: Jan. 16, 1996

[86] PCT No.: PCT/CH96/00019

§ 371 Date: Jun. 25, 1997

§ 102(e) Date: Jun. 25, 1997

[87] PCT Pub. No.: WO96/22497

PCT Pub. Date: Jul. 25, 1996

[30] Foreign Application Priority Data

Jan. 20, 1995 [CH] Switzerland ............................... 164/95

[51] Int. Cl.[6] ................................................. B01D 47/00
[52] U.S. Cl. .......................... 261/153; 261/111; 261/116; 134/103.3; 165/166
[58] Field of Search ...................... 261/153, 155, 261/111, 116, 152; 165/166; 134/95.3, 103.3; 118/684

[56] References Cited

U.S. PATENT DOCUMENTS

| | | | |
|---|---|---|---|
| 2,825,210 | 3/1958 | Carr | 261/153 |
| 3,156,547 | 11/1964 | Fleck | 134/95.3 |
| 4,477,483 | 10/1984 | Lewis | 118/684 |

*Primary Examiner*—Jay H. Woo
*Assistant Examiner*—Robert Hopkins
*Attorney, Agent, or Firm*—Bachman & LaPointe, P.C.

[57] ABSTRACT

The invention relates to a process and device for cooling and cleaning surface elements of a plate heat exchanger to recover heat from outgoing air by spraying water into a stream of outgoing air. Wetting nozzles are used to spray a fine stream of processed water into the outgoing airflow channels of the plate heat exchanger at equal time intervals. This entails no trickling off of sprayed water and the surface elements swept by outgoing air remain moist until the next spraying. Scouring nozzles are used at the end of a daily cooling period to spray a stream of tap water into the outgoing airflow channels. The wetting device comprises a back-and-forth nozzle rail with wetting and scouring nozzles, the axes of which are preferably located in one plane.

25 Claims, 6 Drawing Sheets

PLATE HEAT EXCHANGER WITH WETTING DEVICE

The invention concerns a process for cooling and cleaning the planar elements of a plate heat exchanger to recover extraction air heat by spraying water into an extraction air flow. The invention also concerns a wetting device for performance of the process.

In the air conditioning of residential, working and storage areas and temperature-sensitive objects, depending on the sensitivity level, heating and/or cooling for heating but also for cooling, the recycling principle has begun to apply in view of the ever tightening ecological constraints combined with rising energy costs. The extracted air, depending on the season, is used to pre-cool or pre-heat the outside air. To achieve maximum efficiency, the two air flows are passed through each other, strictly separated and with a maximum exchange surface area. The plate heat exchangers frequently used for this work on the backflow principle or preferably the cross-flow principle.

A plate heat exchanger for ventilation systems is described for example in EP, A2 0449783. This heat exchanger consists of planar elements of similar form stacked onto each other and spaced apart by means of inserted or moulded spacers. This cross-flow heat exchanger, thanks to the thin planar elements and the intermediate spaces which are usually only 0.2–1.5 cm wide, allows an efficient transfer of heat between the two crossing air flows. The plates, for example 0.1–0.5 mm thick, preferably consist of a good heat conductive metal such as aluminium or steel but also of mechanically strong plastic or a composite material.

It is known to improve the cooling of the external air passed through a plate heat exchanger by the effect of tap water nozzles. Spraying takes place preferably onto the extraction air inlet side. A spray cone is aimed at the planar elements, the spray water drips onto the outlet side of the extraction air, is caught and usually pumped back into a circuit system. Heat convection and partial evaporation of the water cools the planar elements. Heat can be extracted from the external air flow crossing on the other side of the planar element without influencing its moisture balance.

Figure 1:
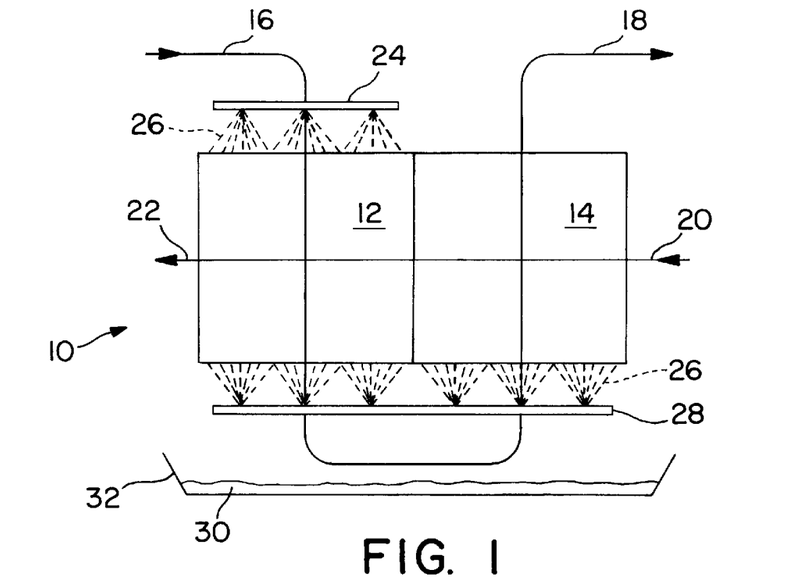

FIG. 1 shows a diagrammatic view of a known plate heat exchanger 10 with vertically arranged parallel planar elements which comprise two blocks 12, 14. The extraction air flow 16 passes firstly through block 12 then through block 14 from which it emerges as continuation air flow 18. On the inlet side of the extraction air flow 16 is arranged a nozzle rail 24 with three nozzles, not shown for the sake of simplicity, each of which sprays a spray cone 26 into the inlet slot of element 12. On a further opposite nozzle rail 28 are arranged three nozzles in the area of element 12 spraying against the air flow and three nozzles in the area of element 14 spraying in the direction of the air flow. The water 30, permanently sprayed with considerable surplus into the plate heat exchanger 10, drips into a catchment trough 32. With a pipe or hose system not shown, the water 30 can be pumped back into the fixed mounted nozzle rails 24, 28, after cleaning where applicable, or passed to the waste water system. This cooling system requires a large quantity of tap water and is costly to operate.

Figure 2:
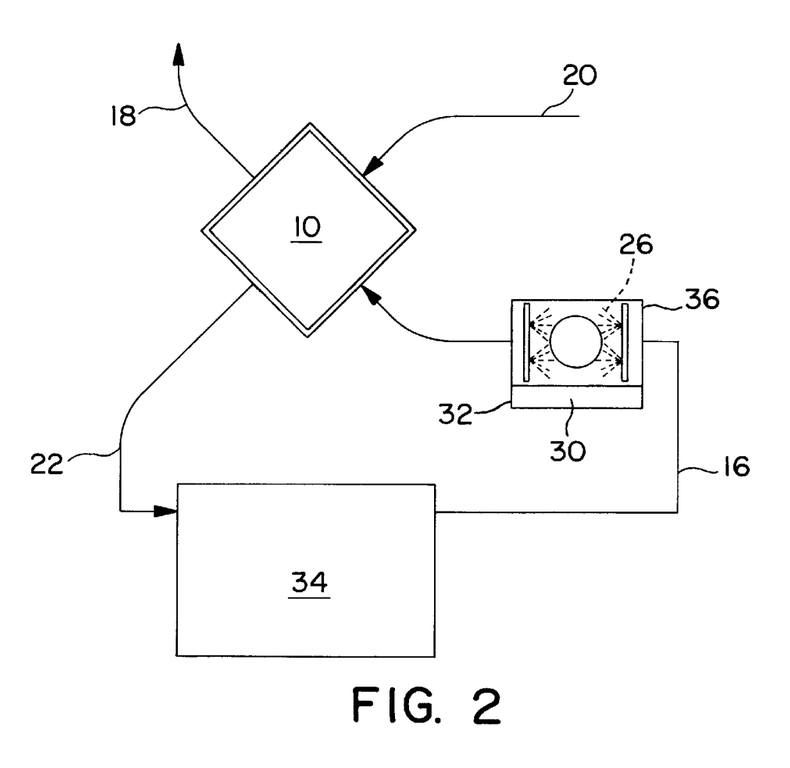

FIG. 2 shows diagrammatically a cooling system which comprises a plate heat exchanger 10 with a single block. The extraction air flow 16 guided from a room 34 is passed through a moisturising system 36 with several spray cones 26. The moistened extraction air flow 16 is cooled for example from 25 to 19° C. As the external air flow 20 crossing in the heat exchanger 10 is warmer, the planar elements in the exchanger remain dry.

The purpose of the invention is to create a process and a device of the type described above in which the efficiency of the cooling water used is increased. The plate heat exchanger can also be cleaned with the same device.

In relation to the process, a task is solved according to the invention in that by means of wetting nozzles a fine spray jet of treated water is sprayed upstream at equal time intervals into the extraction air flow channels of the plate heat exchanger, where no sprayed water drips and the planar elements coated by the extraction air remain damp until the next spraying, and by means of flushing nozzles at the end of a daily cooling period, a spray jet of tap water is sprayed upstream into the extraction air flow channels of the plate heat exchanger. Special and further design forms of the process will be discussed hereinbelow.

The wetting and flushing nozzles are guided at a constant or adjustable speed over all inlet slots of the extraction air flow channels of the plate heat exchanger, so they are also referred to as travelling nozzles. After a certain time interval, these travelling nozzles are guided over the said inlet slots again, preferably at the same constant speed and in the same direction. The water quantity supplied per surface unit can suitably be controlled by the speed of the travelling nozzles, also in combination with metering valves. The specific water quantity sprayed depends on the absorption capacity of the coated planar elements. The time interval until the next passage of the travelling nozzles with the low throughput, known as wetting nozzles, depends on the drying time of the water absorbed by the planar element. The planar elements must still have a residual moisture before the next nozzle pass. The optimum values can be determined and recorded by calculation and/or calibration measurements.

Plate heat exchangers in accordance with the cited EP, A2 0449783 have proved particularly favourable. Capillary action stores water between the planar elements and the corrugated strips which allows residual moisture to be retained for longer.

Because the water supplied to the wetting nozzles is metered in such low quantities that it does not drip, it must be treated. All known processes for water treatment can be used, the most common processes are softening, desalination or deionisation with an ion exchanger. Thus mineral deposits on a planar element can be restricted to a minimum.

According to the invention, the additional cooling from spraying with water takes place exclusively by evaporative heat which is extracted from the planar elements and hence the external air flow adjacent the other side.

Both during wetting and flushing, it is advantageous for the maximum proportion of water droplets to be flung directly onto the planar elements. The spray jet entering the flow channel of the exchanger leads to such strong turbulence that a good wetting or flushing effect occurs behind the direct spray jet. The effect can be increased significantly by the geometric shape of the spray jet. A flat jet is particularly suitable as the water droplets are carried evenly and concentratedly into the extraction air flow channels of the plate heat exchanger. Depending on the flat jet nozzle used, the spray angle is usually between 25 and 130°. The smaller the spray angle of a flat jet nozzle, the greater the distance required for complete surface covering from the linearly arranged nozzles.

The specific water quantity discussed above which is required to keep the planar elements damp can, according to the design examples on which the invention is based, lie in the range from 0.1 to 1 l/min at a spray angle of approximately 110° and a pressure of 3 bar. With a view to the volume flow of treated wetting water required for the entire plate heat exchanger, the equivalent bore diameter of the flat jet nozzle is selected and the pressure applied for the spray water is set. The pressure applied usually lies in the range from 1–10 bar but may be increased further, in particular when wetting. For daily flushing of the mineral deposits with the high performance travelling nozzles, which are preferably also designed as flat jet nozzles, the volume flow of tap water suitably lies in the range of 2–10 l/min.

The wetting water is preferably sprayed with a time interval of 2–15 min, in particular 5–10 min. As stated, this depends on the absorption capacity of the planar elements for treated water but also on the extraction air flow passing per time unit, its contact time with the planar elements, their temperature and relative humidity.

After each cooling period, eg. one heating day, the flushing nozzles are switched on and passed several times over the plate heat exchanger, in practice usually 5–10 times, with the nozzles permanently switched on. Flushing suitably takes place automatically after switching off the wetting nozzles. After very long cooling periods or on long term operation, the flushing nozzles, which can also work simultaneously with the wetting nozzles, are switched on for example every 6, 8 or 12 hours, preferably under the control of a processor or microprocessor.

The efficiency of the flushing can be increased if heated tap water is sprayed, for example at a temperature of 60° C.

Suitably, the contamination precipitated from the extracted air is also cleaned during the flushing of mineral deposits. Advantageously therefore an alkali-free washing agent, known in itself, is added to the tap water for the flushing nozzles from time to time, for example on every third, sixth or tenth working cycle depending on the degree of contamination of the extraction air.

The flushing nozzles can also be switched on from time to time in periods without cooling and used exclusively for cleaning.

For both the wetting and the flushing nozzles, it is advantageous if the flat spray jet makes contact with both planar elements of a flow channel at approximately the same force. This is the case if the longitudinal centre plane of the flat spray jet runs parallel to the planar elements.

The absorption capacity of the planar elements for treated wetting water can generally be increased if these are roughened and/or given a hydrophilic coating which increases the water absorption. Optionally the coating can also be hygroscopic in nature where the coating undergoes a reversible chemical reaction with the wetting water in a manner known to the expert. For planar elements of aluminium or an aluminium alloy, roughening takes place preferably by etching, the absorption capacity for wetting water can then be improved subsequently with a hydrophilic paint.

With regard to the wetting device for performance of the process, the task is solved by the invention in that the wetting device has a reciprocating movement nozzle rail with the wetting and flushing nozzles arranged perpendicular to the plane of movement, separate supply lines for the two nozzle systems, guide means and a drive element for the nozzle rail, where means are provided for activating and controlling the water supply. Special and further design examples are discussed hereinbelow.

In addition to a considerably simplified design, a common nozzle rail for wetting and flushing nozzles, also called a double nozzle bar, allows wetting and flushing nozzles to be arranged in an optimum manner. The longitudinal centre plane of the spray jet, in particular a flat spray jet, runs parallel to the planar elements of the plate heat exchanger. With separate nozzle rails this is not possible, and the wetting of the planar elements is uneven because of the offset position of the nozzles.

The axes of the wetting and flushing nozzles of a double nozzle bar are preferably arranged on a common plane. The wetting and flushing nozzles, preferably designed as flat jet nozzles, can however be arranged on two closely adjacent parallel planes of the same double nozzle bar.

The wetting nozzles suitably have an equivalent bore diameter of 0.5–0.8 mm, the flushing nozzles a diameter of 1.3–2 mm. Both nozzles types are preferably fitted with an external thread and can be screwed individually into the nozzle rail.

The wetting nozzles can be also formed as air-water nozzles (air atomizer nozzles) or high pressure airless atomizer nozzles of a known type.

The wetting device according to the invention, in addition to the double nozzle bar, has further preferred design features:

The reciprocating movement of the nozzle rail takes place not by means of limit switches which reverse the movement of direction of a drive element but by a continuously rotating drive element with a carrier for the reciprocating movement.

By means of a preferably mechanically operated water valve, the wetting nozzles are kept closed on the return of the double nozzle bar. Thanks to the wetting exclusively during the forward movement of the double nozzle bar, the wetting intervals for all extraction air flow channels of the plate heat exchanger are equal.

A temperature sensor in the supply air only switches on the wetting system when a minimum temperature has been exceeded. In the cold season, when manual or automatic wetting is permanently disconnected, the plate heat exchanger can achieve a pre-warming of the external air.

The specific advantages of the invention can be summarised as follows:

The planar elements in the extraction air flow channels of the plate heat exchanger are periodically wetted without the water dripping.

The majority of the cooling takes place by evaporative heat.

Wetting and flushing nozzles can be arranged on a double nozzle rail, which allows design advantages and simpler, cheaper operation with even wetting of the planar elements.

The design principle with the double nozzle rail allows a continuously rotating drive element with mechanically-controlled disconnection of the wetting water feed on the return.

The invention is explained in more detail from the design examples shown in the drawing which also form the subject of dependent patent claims. The diagrams show:

Figure 3:
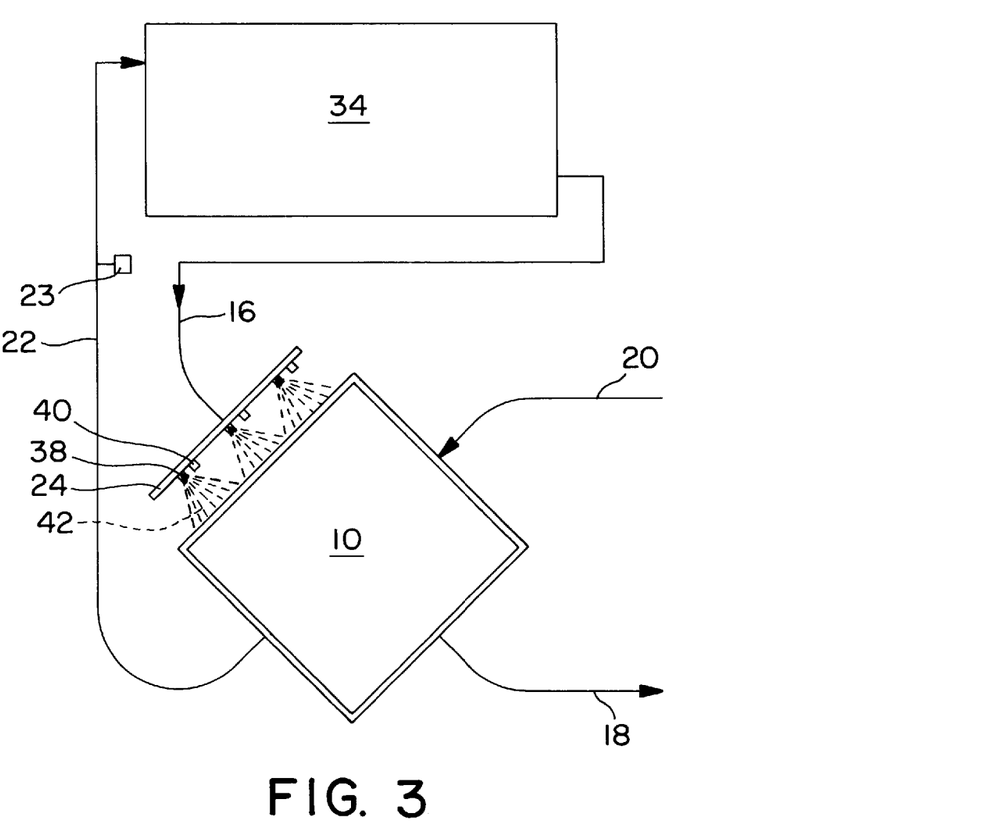
FIG. 3: a principle sketch of evaporative cooling.

In the principle sketch of FIG. 3, an external air flow 20 passes through a plate heat exchanger 10 shown in detail in EP, A2 0449783. After cooling from eg. 32° C. to approx 22° C., it becomes the supply air flow 22 which flows into a room 34 to be cooled. After some time, for example approx 5 to 10 minutes, the supply air has passed through the room 34 and is guided to the plate heat exchanger 10 as a heated extraction air flow 16 with a temperature of approximately 26° C. The extraction air flow 16 enters the plate heat exchanger 10 as a cross-flow in relation to the external air flow 20 and leaves this as continuation air flow 18 heated to approximately 25° C. For low performance flat jet nozzles, the wetting nozzles 38, treated water is sprayed into the inlet openings of the plate exchanger 10. Three high performance flat jet nozzles, the flushing nozzles 40, are not in use. The double nozzle rail 24 travels along the inlet side upstream for the extraction air flow 16. The flat jet 42 extending in the direction of the planar elements is then sprayed.

Figure 4:
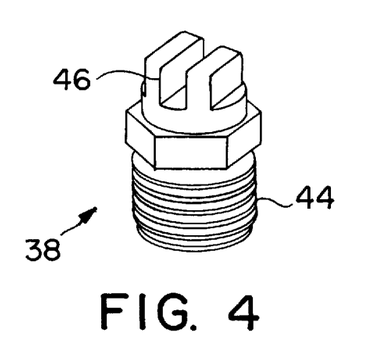
FIG. 4: a perspective view of a low throughput wetting nozzle.
Figure 5:
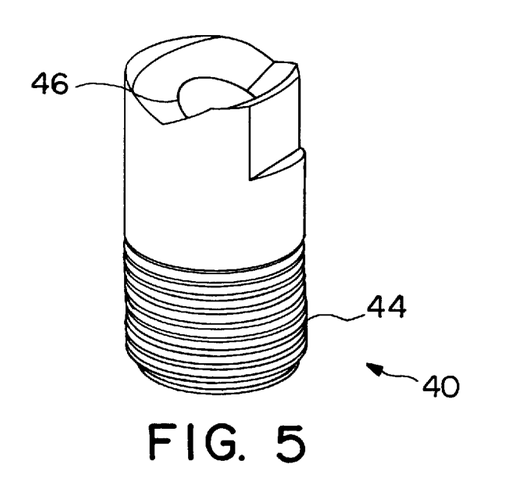
FIG. 5: a perspective view of a high throughput flushing nozzle.

The flat jet nozzles 38, 40 shown in FIGS. 4 and 5 both have an external thread 44 for screwing into the nozzle rail 24. The equivalent diameter for the bore 46 of the low throughput wetting nozzle 38 is 0.6 mm, and that of the high throughput flushing nozzle 40 is 1.5 mm. The plate heat exchanger 10 with its flanged wetting device 48 comprises a single block 12. The plate heat exchanger becomes a wetting device by spraying. Similarly the wetting device 48 arranged on the inlet side of the extraction air flow 16 can extend over several blocks 12.

Figure 6:
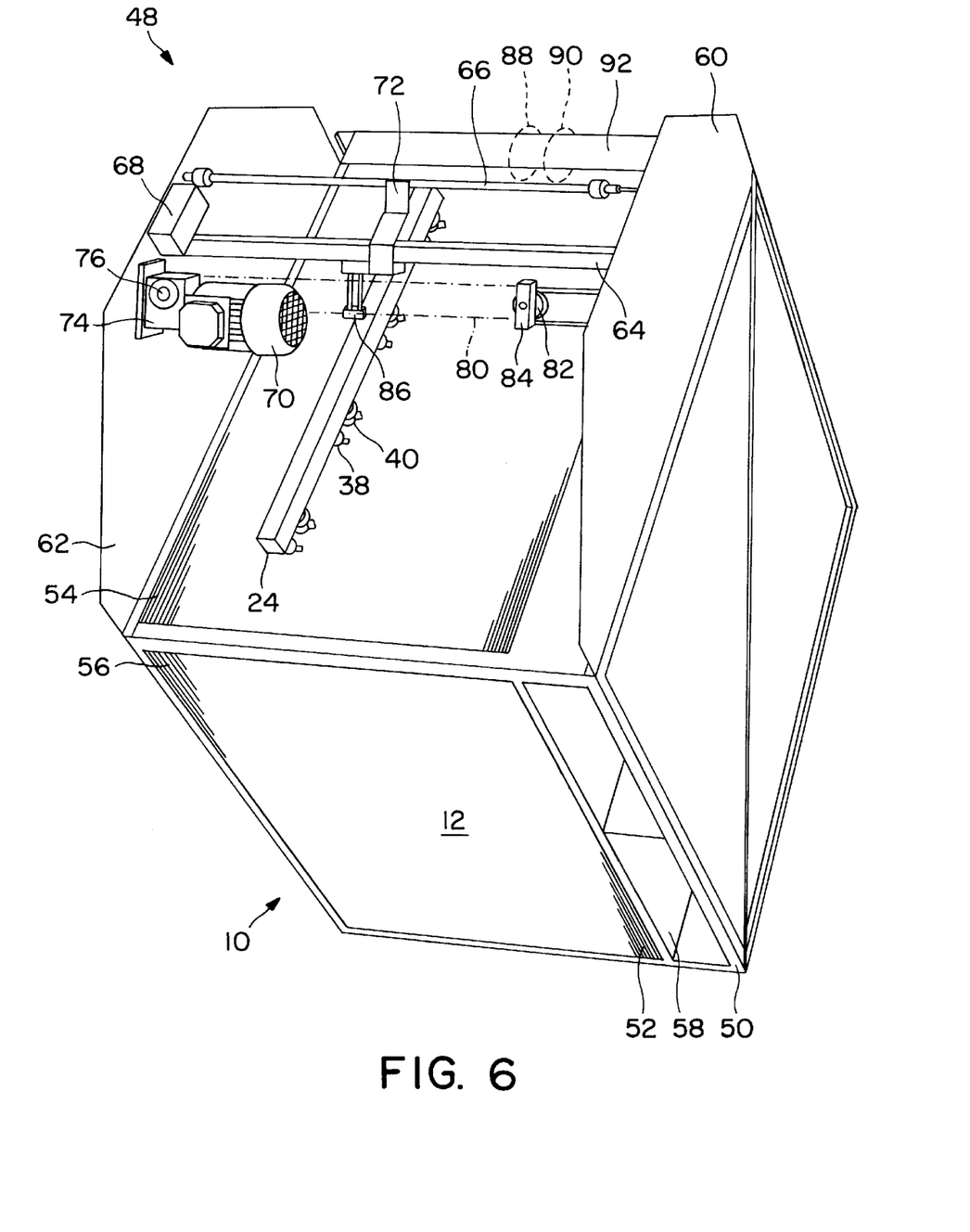
FIG. 6: a perspective view of a plate heat exchanger with wetting device.

The essentially square block 12 held by a frame 50 in accordance with FIG. 6 consists of planar elements 52 of the same shape stacked onto each other and spaced by inserted or moulded spacers which are merely indicated. These planar elements 52 are folded at right angles twice in the same direction and rotated by 90° to each other to form contact flow cross sections on opposite sides. The angled legs surround the next planar element. Two adjacent planar elements 52 in each case form a flow channel 54 for the extraction air or a flow channel 56 for the external air. The flow channels 54, 56 crossing each other, as shown by the preceding statements, are arranged alternately and closed to the other air flow in each case. Thanks to the large thin planar elements and the narrow flow channels 54, 56, an excellent heat exchange is guaranteed. See EP, A2 0449783 for details of the plate heat exchanger 10.

The frame 50 for the element 12 with a cover plate 58 to protect the outermost planar element 52, is formed extended for the installation of the wetting device 48. The construction elements of the wetting device 48 are attached to side panels 60, 62.

Figure 8:
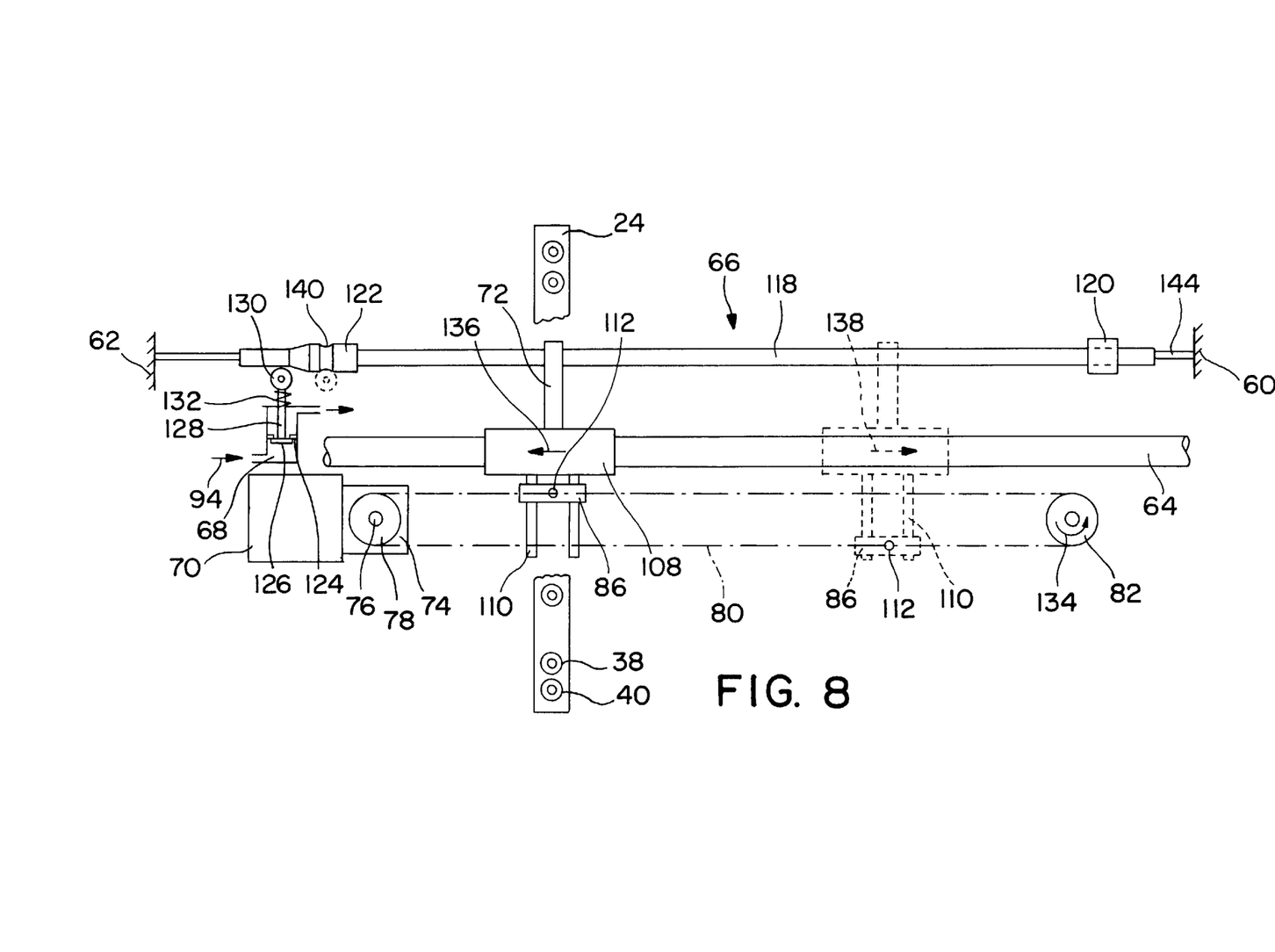
FIG. 8: a principle sketch of the drive and mechanical switching system of a double nozzle rail.

Between the two side panels 60, 62 runs a guide profile 64 for the nozzle rail 24 and a switch rod 66, explained in detail later, for a stationary water valve 68. On one side panel 62 is mounted a dust-tight electric motor 70 and a gear 74 with a drive shaft 76 (FIG. 8) acting on a drive roller 78. This causes a flexible drive element 80, in the present case a chain, to assume a continuous rotation movement. The drive element 80 is tensioned by a freely rotating deflecting roller 82 which is attached by a suspension 84 to the cover plate 64. To the drive element 80 is attached a slider 86 which transmits the movement of the drive element 80 as a reciprocating movement to the nozzle rail 24, the double nozzle bar. Further details are shown in FIG. 8.

Water supply hoses 88, 90 for supplying the wetting nozzle 38 with treated water and the flushing nozzle 40 with tap water are, as shown in dotted lines, wound helically about a vertical guide 92 and can therefore easily follow the reciprocating movement of the nozzle rail 24. Optionally the water supply hoses 88, 90 can also be wound about a guide 92 with hose coils running into each other.

Figure 7:
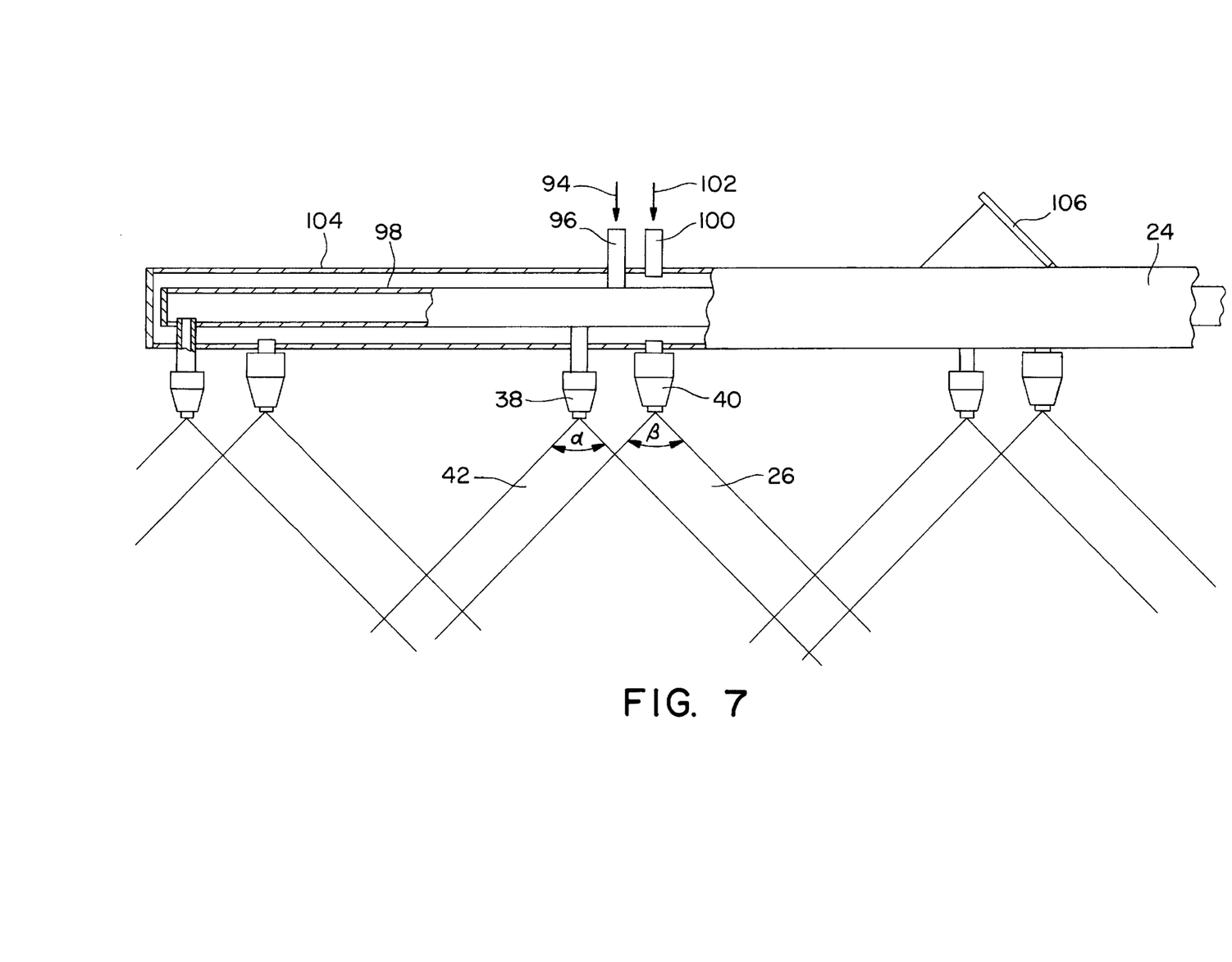
FIG. 7: a part sectional view of a double nozzle rail.

The nozzle rail 24 shown in partial section in FIG. 7 shows in particular the water supply to the wetting nozzles 38 and the flushing nozzles 40. The treated water, indicated by arrow 94, is passed via a supply connector 96 into an inner pipe 98 which is closed at both ends. From there the treated water flows through the wetting nozzles 38 and forms a flat spray jet 42 with a spray angle α of approx 90°.

By way of a further supply connector 100, when the water valve is switched on at the end of a cooling period, tap water indicated by arrow 102 enters the external pipe 104 of the nozzle rail 24. This pipe is also closed at both ends where the end walls of the inner and outer pipe can be common. The tap water is expelled via the flushing nozzles 40 and forms a spray jet 26 as a flat jet with a spray angle β of also approx 90°. For the sake of simplicity, both spray cones 26, 42 have been shown in FIG. 7 although these are usually switched on separately.

Instead of an inner and an outer pipe 98, 104, the nozzle rail 24 can also contain two parallel adjacent pipes where the nozzle arrangement remains unchanged.

The nozzle rail 24 is held via a fixing flange 106 on a reciprocating guide block 108. As FIG. 8 shows, this slides or rolls along guide profile 64 formed in the present case as round bars. In one variant, the guide block 108, instead of a sliding surface, may have several rollers and is then referred to as a guide trolley. In the direction of the flexible drive element 80, a chain, the guide block 108 has two forked slide rods 110 projecting at right angles. These reach through corresponding holes in the sliding element 86 which is connected by way of a carrier 112 with a swivel axis in an articulated joint with the chain.

The switch rod 66 comprises an external sleeve 118 which is longitudinally displaceable on a holding rod 144 attached to the panels 60, 62.

Permanently connected to the external sleeve 118 of the switch rod 66 is a right and a left stop ring 120, 122 for a cam 72 which can at the same time serve to prevent the guide block 108 from turning. The left stop ring 122 is also a mechanical control element for the permanently mounted water valve 68 of the treated water shown by arrow 94. In the tubular valve housing is formed an annular valve seat 124 on which lies a valve plate 126 in the closed position. This is connected via a valve pusher 128 with a valve wheel 130 which lies on the lower stop ring 122 when the switch rod is moved. A helical spring 132 holds the water valve 68 in the closed position when the valve pusher 128 is not loaded.

As indicated by the arrows 134, 136 pointing in the same direction, according to FIG. 8 the nozzle rail 24 is moved to the left. The flexible drive element 80 rotating in the direction of arrow 134 transfers the force exerted via the carrier 112 of the slider 86 onto the slide bars 110 of the guide block 108. By way of the fixing flange 106 (FIG. 7), the movement is transferred to the nozzle rail 24. When the carrier 112 is passed over the drive roller 78, it moves with the sliding element 86 along the slide bars 110 and begins the movement to the right in the direction of arrow 138. Thus the direction of movement of the nozzle rail 24 can be reversed with a continuous drive movement.

When approaching the extreme left point, cam 72 pushes the left stop ring 122 of the outer sleeve 118 of the switch rod 66 to the left, the valve wheel 130 rolls into an angular groove 140 as the water valve 68 opens. On movement to the right, the plate heat exchanger 10 is sprayed with some treated water.

When the carrier 112 with the sliding element 86 reaches the right deflection roller 82, a similar reversal of movement of the nozzle rail 24 takes place. At the same time, the external sleeve 118 is lifted by the cam 72 lying on the right stop ring 120, carrying the left stop ring 122. Thus the valve wheel 130 rolls out of the annular groove 140 again, the helical spring 132 can close water valve 68. The return movement takes place without spraying.

Figure 9:
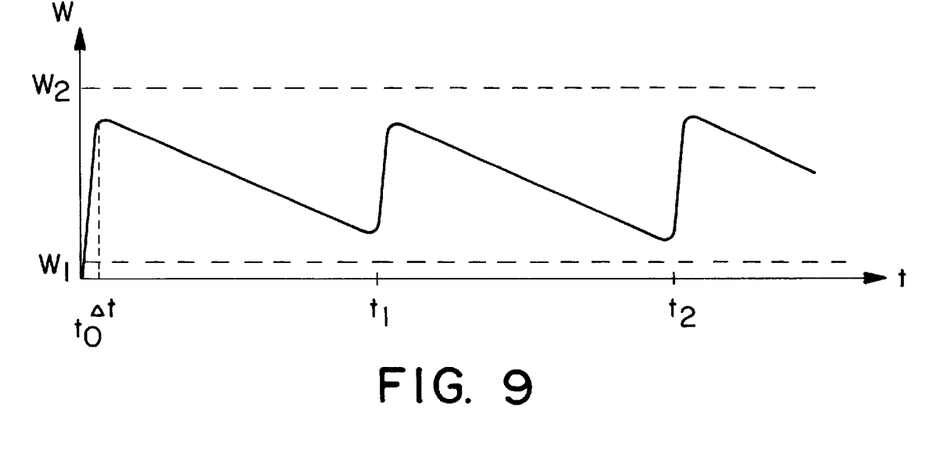
FIG. 9: the moisture balance of a planar element.

FIG. 9 shows the chronological development of the moisture content of a planar element in qualitative terms. At time $t_0$, the planar element is dry. Then during a time $\Delta t$ of a few seconds, treated water is sprayed on which completely wets the planar element. The water content W reaches a peak. This however lies below the droplet limit $W_2$ and no sprayed water can drip. After spraying, the planar element dries continuously until at time $t_1$ is it sprayed again. The time intervals $t_1, t_2-t_1 \ldots t_n-t_{n-1}$ last for example eight minutes each time. The next spraying always takes place before a fixed moisture minimum $W_1$ is reached. The cycle is continued until the end of the cooling period.

I claim:

1. Process which comprises: providing a plate heat exchanger with planar elements which form extraction air flow channels; passing an extraction air flow through said plate heat exchanger; cooling said planar elements of said plate heat exchanger to recover extraction air heat by spraying water into said extraction air flow, including the step of utilizing wetting nozzles to periodically obtain a fine spray jet of treated water sprayed upstream at substantially equal time intervals into the extraction air flow channels of the plate heat exchanger with substantially no water drips, wherein the planar elements are swept by the extraction air and remain damp until the next spraying; and utilizing flushing nozzles to periodically obtain a spray jet of tap water sprayed upstream into the extraction air flow channels of the plate heat exchanger.

2. Process according to claim 1, wherein said wetting nozzles periodically obtain a fine spray jet with a volume flow of 0.1 to 1 l/min.

3. Process according to claim 2, wherein said flushing nozzles periodically obtain a spray jet at a volume flow of 2–10 l/min.

4. Process according to claim 1, wherein the flushing nozzles are sprayed at the end of a daily cooling period.

5. Process according to claim 1, wherein at least one of softened, desalinated and deionized water is applied by the wetting nozzles.

6. Process according to claim 1, wherein the wetting and flushing water is sprayed as a flat jet.

7. Process according to claim 4, wherein said jet has a spray angle of 25–130°.

8. Process according to claim 5, wherein said spray angle is approximately 110° at 1–3 bar.

9. Process according to claim 1, wherein the wetting water is sprayed with a time interval of up to 15 minutes.

10. Process according to claim 9, wherein said time interval is 2–15 minutes.

11. Process according to claim 10, wherein said time interval is 5–10 minutes.

12. Process according to claim 11, wherein at least periodically the flushing water is at least one of heated and an alkali-free washing agent is added.

13. Process according to claim 11, wherein the spray jet of the wetting and flushing nozzles contact planar elements of an extraction air flow channel with approximately the same force.

14. Process according to claim 11, wherein wetting of the planar elements is improved by at least one of roughening and coating the planar elements.

15. Process according to claim 11, including providing a hydrophilic paint coating on the surface of said planar elements.

16. Wetting device, which comprises: a plate heat exchanger with planar elements forming extraction air flow channels, means for providing an extraction air flow through said plate heat exchanger, wetting nozzles operative to periodically provide a fine spray jet of treated water sprayed upstream into the extraction air flow channels with substantially no water drips; flushing nozzles operative to periodically provide a spray jet of tap water sprayed upstream into the extraction flow channels, a reciprocating movement nozzle rail with the wetting and flushing nozzles arranged perpendicular to the plane of movement of said rail, separate supply lines for the wetting and flushing nozzles, guide means for said rail, and a drive element for said rail, wherein means are provided for activating and controlling water supply.

17. Wetting device according to claim 16, wherein said nozzle rail is mounted on a slide rail and wherein the axes of the wetting nozzles and flushing nozzles are arranged on the same plane.

18. Wetting device according to claim 17, wherein the wetting and flushing nozzles can be individually exchanged.

19. Wetting device according to claim 16, wherein the wetting nozzles have an equivalent bore diameter of 0.5–0.8 mm, and the flushing nozzles have an equivalent bore diameter of 1.3–2 mm.

20. Wetting device according to claim 16, including a flexible drive element for said nozzle rail, guided on a drive and a deflecting roller.

21. Wetting device according to claim 20, wherein said flexible drive element is a chain.

22. Wetting device according to claim 16, including a switch rod connected to a water valve for the wetting nozzles operative to switch off said wetting nozzles.

23. Wetting device according to claim 16, including a supply air flow for a room to be cooled and a temperature sensor which starts a wetting cycle when a specified temperature is exceeded.

24. Wetting device according to claim 16, wherein said wetting nozzles are operative to spray with a volume flow of 0.1–1 l/min., and said flushing nozzles are operative to spray with a volume flow of 2–10 l/min.

25. Wetting device according to claim 24, wherein said wetting nozzles are operative to spray at substantially equal time intervals and wherein the planar elements are swept by the extraction air and remain damp until the next spraying.

* * * * *

UNITED STATES PATENT AND TRADEMARK OFFICE
CERTIFICATE OF CORRECTION

PATENT NO. : 5,919,406
DATED : July 6, 1999
INVENTOR(S) : FRIEDRICH BACHOFEN

It is certified that error appears in the above-identified patent and that said Letters Patent is hereby corrected as shown below:

In column 8, claim 12, line 1, "claim 11" should read --claim 1--.

In column 8, claim 13, line 4, "claim 11" should read --claim 1--.

In column 8, claim 14, line 8, "claim 11" should read --claim 1--.

Signed and Sealed this

Ninth Day of November, 1999

Attest:

Q. TODD DICKINSON

Attesting Officer

Acting Commissioner of Patents and Trademarks